United States Patent [19]

Desai et al.

[11] Patent Number: 4,657,572
[45] Date of Patent: Apr. 14, 1987

[54] BUSHING BALANCE CONTROLLER AND METHOD FOR USING SAME

[75] Inventors: Avinash J. Desai, Reynoldsburg, Ohio; Gerhard Kreikebaum, Knoxville, Tenn.

[73] Assignee: Owens-Corning Fiberglas Corporation, Toledo, Ohio

[21] Appl. No.: 839,676

[22] Filed: Mar. 14, 1986

[51] Int. Cl.⁴ .............................................. C03B 5/02
[52] U.S. Cl. ............................................. 65/1; 65/2; 65/29; 65/160; 65/162; 65/DIG. 4; 219/485; 219/486; 219/509; 373/28; 373/40
[58] Field of Search ................... 65/1, 2, 29, 160, 162, 65/DIG. 4; 373/28, 40; 219/485, 486, 509

[56] References Cited

U.S. PATENT DOCUMENTS

| | | | |
|---|---|---|---|
| 3,246,124 | 4/1966 | Tretheway | 219/501 |
| 4,024,336 | 5/1977 | Jensen | 13/6 |
| 4,162,379 | 7/1979 | Sebens et al. | 219/497 |
| 4,167,403 | 9/1979 | Coggin | 65/1 |
| 4,285,712 | 8/1981 | Thompson | 65/2 |
| 4,343,637 | 8/1982 | Shofner et al. | 65/2 |
| 4,511,791 | 4/1985 | Desai et al. | 219/497 |
| 4,515,614 | 5/1985 | Barkhau et al. | 65/29 |
| 4,546,485 | 10/1985 | Griffiths et al. | 373/28 |

OTHER PUBLICATIONS

"Standard Handbook for Electrical Engineers", Donald G. Fink, Editor in Chief, McGraw-Hill Publishing Company, pp. 2-5.

Primary Examiner—Robert Lindsay
Attorney, Agent, or Firm—Ronald C. Hudgens; Greg Dziegielewski; Ronald E. Champion

[57] ABSTRACT

The bushing balance controller is an electronic device which measures the voltage drop across each segment of a multiple segment glass fiber forming bushing and measures the current flow in the bushing. The device uses these measurements to produce error signals proportional to the difference in the set point temperature and the instantaneous temperature of each segment of the bushing. The device diverts current from each segment of the bushing whose error signal is greater than the average of the error signals for all segments of the bushing. The device also sums all error signals and passes this signal to a bushing controller which adds current to the bushing when the sum of the error signals falls below a preset value.

5 Claims, 4 Drawing Figures

BUSHING BALANCE CONTROLLER AND METHOD FOR USING SAME

TECHNICAL FIELD

The Bushing Balance Controller relates to glass fiber production arts and specifically to an apparatus and method to maintain or balance the temperature across each segment of a multiple segment glass fiber producing bushing.

BACKGROUND OF THE INVENTION

One method of producing glass fibers is to attenuate molten galss through a precious metal bushing to produce fibers. The bushing forms a container with holes spaced therein through which the molten glass is drawn by mechanical means. It is advantageous to heat this bushing to produce a uniform temperature for drawing the molten glass. A high electrical current is passed through the metal to electrically heat the bushing. The diameter of the fibers produced is dependent upon the composition of the glass, the temperature of the glass, the temperature of the bushing, the thermal conditions below the bushing which affects the rate of cooling of the molten glass fibers, and the stress introduced into the fiber by the mechanical attenuation of the fibers. The object of the attenuation process is to produce a plurality of fibers of uniform diameter. In large multiple segment bushings it has been found that maintaining a constant temperature within each segment of the bushing aids in maintaining uniform fiber diameter.

Accurate determination of temperature in a glass fiber forming bushing is in the range of 2000-2500 degrees Fahrenheit. Thermocouples have a short life at this temperature, they only measure temperature at one point and there is a finite time lag between a change in temperature and a change in thermocouple reading. Infrared temperature measurement has been frustrated because of the presence of the issuing streams of molten glass and the crowded conditions beneath the bushing caused by fin shields and other devices. An accurate method of determining the average temperature across a segment of a multiple segment bushing can be accomplished by determining the instantaneous resistance change in each segment of the bushing.

The multiple segment bushing acts as a series connection of resistors whose resistance changes with temperature. Over a narrow band of temperatures, within the glass melting range, the value of each resistor changes in a linear fashion with temperature. This linear function can be expressed as:

$$R_i = R_o[1 + \alpha(T_i - T_o)]$$

where $R_o$ is the resistance of the segment of the bushing at a set point temperature $T_o$, and $R_i$ is the instantaneous resistance of the i th segment of the bushing at the instantaneous temperature $T_i$. The term $\alpha$ is the temperature coefficient of resistance for the material of the bushing and is given in various reference books of various metals and temperature ranges. The current flowing in a bushing and the voltage drops across each segment of the bushing can be measured. By using ohm's law, the instantaneous resistance can be determined. The resistance at a set point temperature of the material, $R_o$, being known, and the coefficient of resistance for temperature, $\alpha$, being known the change in temperature can be directly inferred. This signal can then be used for control and balance of all segments of the bushing.

DISCLOSURE OF INVENTION

In accordance with this invention, an electronic system is provided to maintain a constant temperature within each segment of a multiple segment glass fiber forming bushing and to balance the temperature between segments of the bushing. The system measures the voltage drop across each segment of the bushing and the current flowing in the system. An error or deviation signal is produced which is proportional to the difference in the actual temperature of that segment of the bushing and a set point temperature. The error signal is derived from the measured voltages and the measured current. The error signal for a given segment of the bushing is compared to the average of all error signals for all segments of the bushing and current is diverted from each segment whose error signal is greater than the average error signal. This allows the system to maintain balance between the segments. The sum of all error signals is fed to a conventional bushing controller which supplies additional current to the bushing when the sum of the error signals is below a preset value. In this manner the system maintains a uniform temperature across the bushing.

BEST MODE FOR CARRYING OUT THE INVENTION

Figure 1:
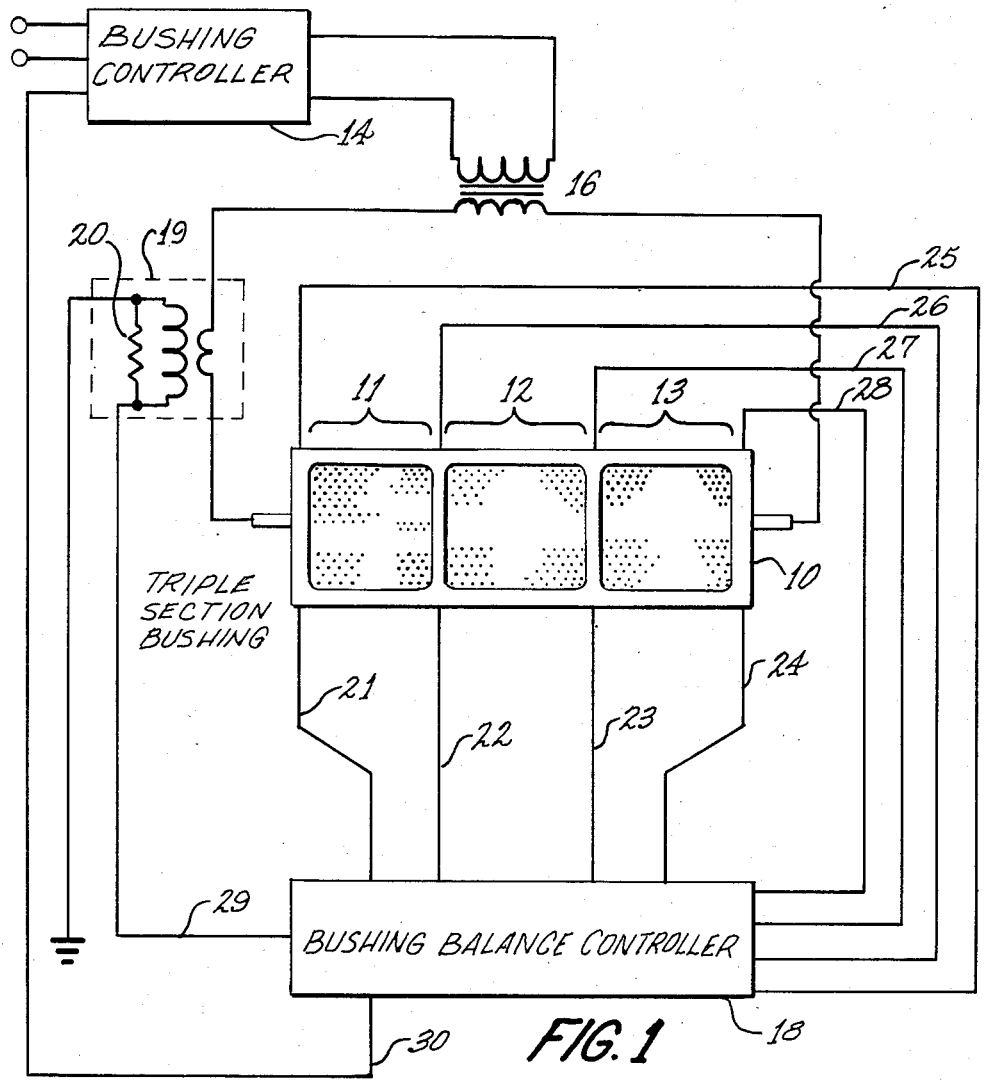
FIG. 1 is an illustration showing the electrical connections between a glass fiber forming bushing, the bushing balance controller, the bushing controller and the current transformer.

FIG. 1 is an illustration showing the electrical interconnection between a mineral or glass fiber forming bushing, a bushing balance controller, a bushing controller and a current transformer which measures the current flowing in the bushing. A glass fiber forming bushing 10 is designed such that it is divided into three sections—11, 12 and 13. Power is fed to the bushing through a power transformer 16. The amount of power is controlled by a bushing controller 14. A signal on line 30 informs the bushing controller when to supply power to the power transformer. A current transformer 19 determines the current flowing in the bushing. The curren signal picked up by the current transformer is dropped across a precision resistor 20 producing a voltage signal in line 29 which is proportioned to the current flowing in the bushing. The bushing has four signal lines—21, 22, 23 and 24—welded to the bushing. These signal lines are feed to a bushing balance controller 18. The difference in the voltage between signal line 21 and 22 represents the voltage drop across segment 11 of the bushing. The difference in the voltage between signal lines 22 and 23 represents the voltage drop across segment 12 of the bushing. The difference in the voltage between signal line 23 and 24 represents the voltage drop across segment 13 of the bushing. The difference in the voltage between signal line 21 and 24 represents the total voltage drop across the bushing. The voltage on signal line 29, which represents the current flowing in the bushing, is also fed to the bushing balance controller. If any segment of the bushing is hotter than the average temperature of the bushing, a small amount of current is diverted from that section of the bushing by the bushing balance controller, as will be explained below. In order to accomplish this current diversion, four current diversion lines—25, 26, 27 and 28—are welded to the bushing and connected to the bushing balance controller.

Figure 2:
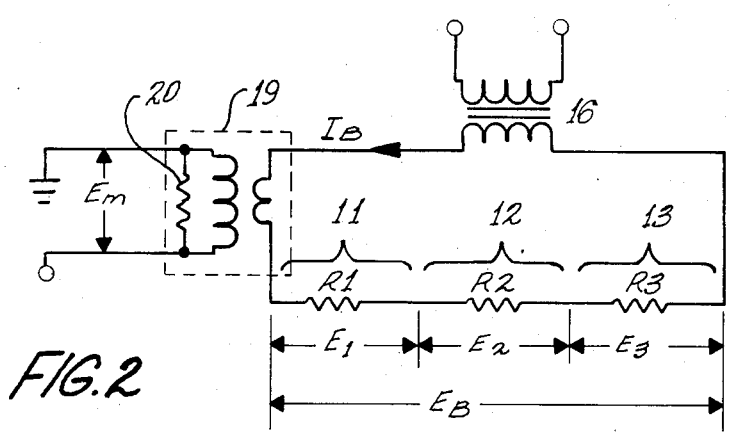
FIG. 2 is an electrical diagram showing the voltage drops and current flowing in the bushings.

FIG. 2 is an electrical diagram representing the voltage drops and current flowing in the bushing. A glass fiber forming bushing, since it is electrically heated and relies on the resistance of the metal in the bushing to produce the heating, can be represented by a series of resistors. $R_1$ represents the resistance of section 11 of the bushing. $R_2$ represents the resistance of section 12 of the bushing. $R_3$ represents the resistance of section 13 of the bushing. Each of these resistances change as the temperature of the bushing changes.

The resistance, temperature relationship of materials used in glass fibers providing bushings can be represented by:

$$R_i = R_o[1 + \alpha(T_i - T_o)] \quad [1]$$

where:
- $R_i$—instantaneous resistance of section i of the bushing
- $R_o$—resistance of that section of the bushing at the set point temperature $T_o$
- $T_i$—instantaneous temperature of section i of the bushing
- $T_o$—set point temperature
- $\alpha$—temperature coefficient of resistance for material used as a bushing In the present case of a triple section bushing, the total resistance of the bushing $R_B$ can be represented by:

$$R_B = R_1 + R_2 + R_3 \quad [2]$$

The current flowing in the bushing $I_B$ is the same in each segment since there is a series connection. Since voltage, by Ohm's law, is resistance times current, the relationship becomes $$I_B R_B = I_B R_1 + I_B R_2 + I_B R_3$$

or:

$$E_B = E_1 + E_2 + E_3 \quad [3]$$

Figure 3:
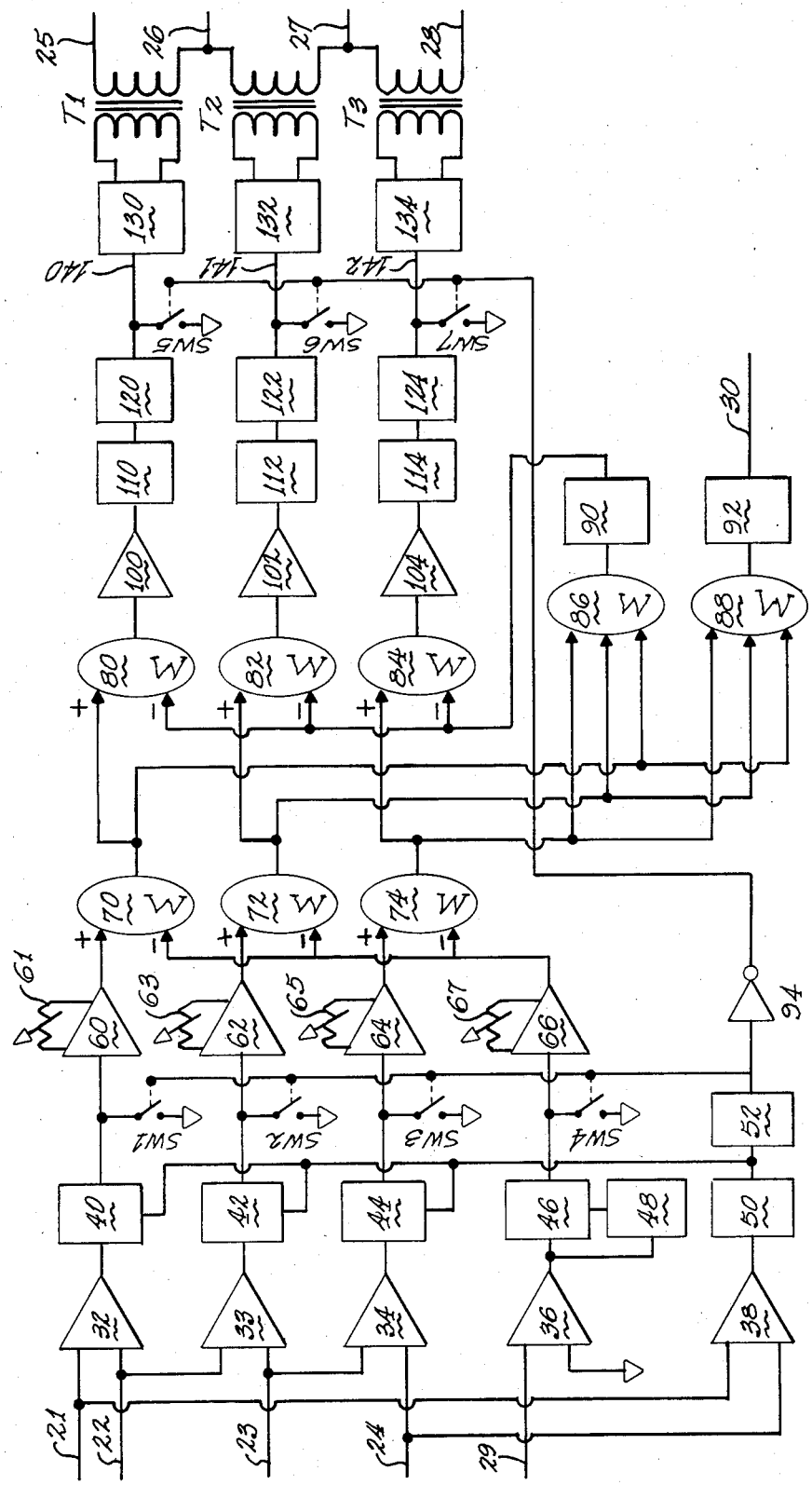
FIG. 3 is an electrical block diagram of the bushing balance controller.

FIG. 3 shows an electrical block diagram of the bushing balance controller which is the box numbered 18 in FIG. 1. There are three identical circuits in this diagram, one for each section of the bushing. The first circuit consists of items 32, 40, SW1, 70, 80, 100, 110, 120, SW5, 130 and $T_1$ and is for control of section 11 of the bushing. Section 12 of the bushing is controlled by item 33, 42, SW2, 62, 72, 82, 102, 112, 122, SW6, 132 and $T_2$ which comprises the second circuit. The third circuit controls bushing section 13 and consists of items 34, 44, SW3, 64, 74, 84, 104, 114, 124, SW7, 134 and $T_3$. A detailed description will be given of the first circuit with the understanding that the three circuits operate in the same manner.

Any number of segments of a bushing may be controlled by adding the proper number of circuits, one for each segment of the bushing.

In order to understand the operation of the circuitry, a brief explanation of the theory of operation will be given. As was shown in equation 1, the resistance of section 11 of the bushing is:

$$R_1 = R_o[1 + \alpha(T_1 - T_o)]$$

where:
- $R_1$ = resistance of section 11
- $R_o$ = resistance of material in bushing at set point temperature $T_o$
- $T_1$—instantaneous temperature of bushing section 11

The voltage drop $E_1$ across bushing section 11 is the current times the resistance.

$$E_1 = I_B R_1 = I_B R_o[1 + \alpha(T_1 - T_o)] \quad [4]$$

The voltage $E_1$ is the difference between the voltage and signal line 21 and signal line 22.

In order to control the bushing temperature of section 11 of the bushing, a deviation signal $X_1$ is formed from the relationship:

$$X_1 = CI_B - KE_1 \quad [5]$$

when C and K are constants.

Substituting equation 4 into equation 5 yields:

$$X_1 = CI_B - KI_B R_o[1 + \alpha(T_1 T_o)] \quad [6]$$

when the bushing section is at the proper, or set point temperature $T_1 = T_o$ and we find that the deviation can be expressed as:

$$X_1 = CI_B - KI_{B-Ro} \quad [7]$$

Since the deviation signal should be zero at the set point temperature therefore:

$$K = C/R_o \quad [8]$$

when the temperature across bushing segment 11 does not equal the set point temperature:

$$T_1 \neq T_o T_1 = T_o + \alpha T_1$$

and we get:

$$X_1 = CI_B - KI_B R_o[1 + \alpha(T_o + \alpha T_1 - T_o)] \quad [9]$$

and substituting equation 8 into equation 9 yields:

$$X_1 = KI_B R_o \alpha \Delta T_1$$

Since K, $\alpha$, and $R_o$ are constants, this can be expressed as:

$$X_1 = MI_B \Delta T_1$$

where M is a constant. This deviation signal is linear over small ranges of $\Delta T$.

Referring back to circuit 1 in FIG. 3, the voltage on signal line 21 and the voltage on signal line 22 are fed to differential amplifier 32. The differential amplifier calculates the difference between the two voltage signals and outputs $E_1$ to synchronous detector 40. The synchronous detector is required because the input voltage signals are sine waves and a means is needed to determine the peak of the waves. This is accomplished by feeding signal line 21 and signal line 24 to differential amplifier 38 whcih amplifies the difference and outputs a signal $E_B$ to zero crossing detector 50. The output from the zero crossing detector is a series of pulses which are fed to synchronous detectors 40, 42, and 44 and triggers their response. The voltage signal $E_1$ is then fed from the synchronous detector 40 to an operational amplifier 60. Operational amplifier 60 has a feedback circuit 61 which sets the constants $\alpha$, $R_o$ and K. Since each circuit has an individual feedback current, each segment can be tailored to its individual setting. The new signal is now fed to one input of a summing operational amplifier 70. Simultaneously, the voltage signal $E_M$ on signal line 29 from the current transformer is fed to differential amplifier 36. The output of this differential amplifier is $E_M$ and is fed to zero crossing detector 48 and also to synchronous detector 46. By having a separate zero crossing detector for the current signal line, any phase shift between the current signal and the voltage signal are eliminated. The output from synchronous detector 46 is fed to operational amplifier 66 which has a feedback circuit 67 which sets the gain which is the constant C. The signal is then fed to the second side of the summing operational amplifier 70. The output of summing operational amplifier 70 is now the deviation signal:

$$X_1 = K I_B R_o \alpha \Delta T_1$$

Similarly, output of summing operational amplifier 72 for circuit 2 is:

$$X_2 = K I_B R_o \alpha \Delta T_2$$

and the output of summary operational amplifier 74 for circuit 3 is:

$$X_3 = K I_B R_o \alpha \Delta T_3$$

All three deviation signals $X_1$, $X_2$ and $X_3$ are fed to a summing operational amplifier 86 where they are added. It will be noted that for the general case of n segments, the sum equals: $\Sigma X = X_1 + X_2 + X_3 + \ldots + X_n$. From amplifier 86, the signal is fed to a divide by three circuit 90 and then to the negative side of summing operational amplifiers 80, 82, and 84. Again, in the general case the average deviation or error signal equals:

$$\bar{X} = \Sigma X / n$$

The individual error signals are fed to the positive side of the summing operational amplifier. Referring to circuit 1 again, the summing operational amplifier 80 receives error signal $X_1$ on its positive side and one third of the sum of error signals $X_1$, $X_2$ and $X_3$ on its negative side. The output is then the difference between the signals. This is passed to operational amplifier 100 which passes only the positive portion of the signal to proportional and integral stage 110 which calculates the proportional and integral control of the positive error signal. This signal is then passed to pulse width modulator 120 where the signal is conditioned for control of solid state switching network 130. Solid state switching network 130 controls the current to be by passed from bushing section 11 through signal lines 25 and 26 as will be explained later.

All three error signals $X_1$, $X_2$ and $X_3$ are also fed to summing operational amplifier 88 where they are added together and passed through a low pass filter 92 and then onto signal line 30 to the bushing controller. If the summation of all the error or deviation signals $X_1$, $X_2$ and $X_3$ are greater than zero, the bushing controller does not allow additional power to be fed to the bushing. If the summation of the error signals is below a preset value, the bushing controller increases the current flowing to the bushing.

Referring back to circuit 1, if the output of summing operational amplifier 80 is negative, that is, the specific error signal $X_1$ is less than the average error signal, no current is bypassed from section 11 of the bushing. If, however, the error signal $X_1$ is greater than the average error signal, then power is directed through signal lines 25 and 26 through transformer $T_1$ by solid state switch 130.

It should be obvious from the above discussion that it is impossible to simultaneously measure the voltage drop across each section of the bushing and to divert current flowing in that section. If this were to occur, a runaway condition would exist; the bushing would overheat and catastrophe failure would occur. To prevent this from occurring, solid state switches SW1–SW7 are used. The pulses generated by zero crossing detector 50 are fed to a frequency divide by two circuit 52. This signal is fed to solid state switches SW1, SW2, SW3 and SW4. When activated, these switches pass the measurement signals to ground thereby inactivating the measurement circuits. The signal from the frequency divide by two circuit 52 is fed through an inverter 94 to solid state switches SW5, SW6 and SW7. When the switches SW1–SW4 are open, switches, SW5–SW7 pass the control signals to ground, thereby disabling the control circuit. In this manner, for the first complete cycle of power to the bushing, the measurement circuits are enabled and the control circuits are disabled. In the second full cycle of bushing power, the measurement circuits are disabled and the control circuits are enabled.

Figure 4:
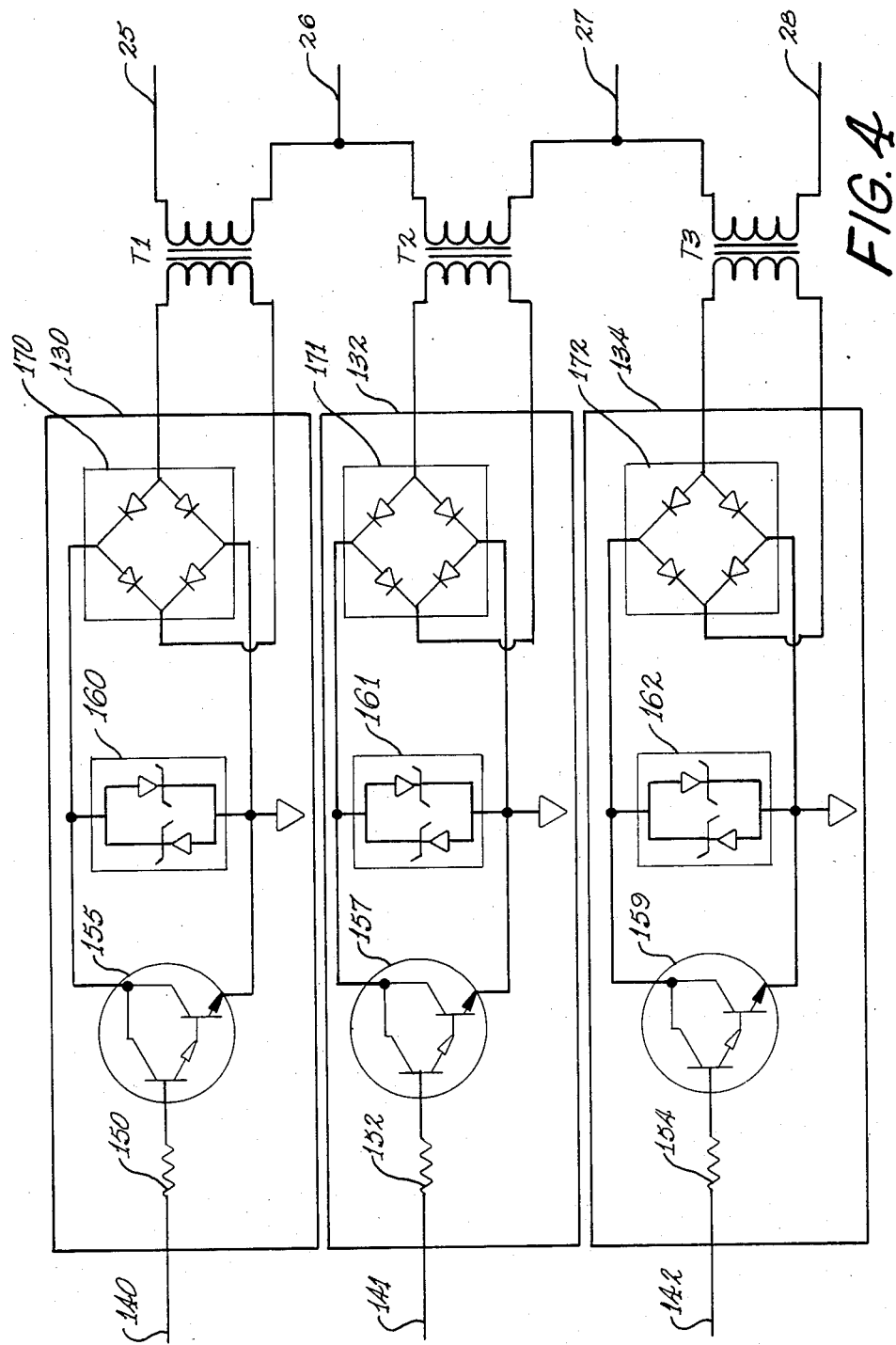
FIG. 4 is an electrical schematic of the solid state switch of the bushing balance controller which diverts current from the bushing.

Referring to FIG. 4, it can be seen how power is diverted from the bushing. The control signal outputted from pulse width modulation 120 is impressed on signal line 140. This signal line is inputted to solid state switch 130. Inside the switch, the signal is fed through a precision one ohm resistor 150 to a DARLINGTON transistor 155. The output of the Darlington transistor is connected to the output of a full wave bridge rectifier 170. Also, across the output of the bridge rectifier, is a varistor 160. The varistor is a voltage dependent resistor which is a non-linear resistor whose value varies inversely with the voltage drop across it. The input of the bridge rectifier is connected to the primary of transformer $T_1$ which typically is a 23:1 transformer. The secondary of transformer $T_1$ is connected to the bushing section 11 through signal lines 25 and 26. In operation when there is no signal on line 140, the Darlington transistor presents an open circuit to the bridge rectifier. Since no current can flow in the circuit, there is no voltage drop to ground and the varistor has infinite resistance. When a signal is present on line 140, the Darlington transistor is conductive and current flows through the bridge rectifier. The varistor's resistance changes to zero and passes the current through the varistor to ground thereby protecting the Darlington transistor from damage. Since transformer $T_1$ is a 23:1 ratio for every ampere passed through the varistor, a total of twenty-three amperes is diverted from the bushing in section 11. In a similar manner, signal line 141, resistor 152, Darlington transistor 157, varistor 16, bridge rectifier 171 and transformer $T_2$ controls diversion of current from bushing section 12. Signal line 142, resistor 154, Darlington transistor 159, varistor 162, rectifier 172 and transformer $T_3$ controls current diversion from section 13 of the bushing.

While there has been shown and described what is considered to be the preferred embodiment of the present invention, it will be appreciated by those skilled in the art that modifications of such embodiments may be made. It is, therefore, intended that the invention and its various modifications only be limited as set forth in the appended claims.

INDUSTRIAL APPLICABILITY

In the production of glass fibers it is desirous to produce a plurality of fibers of uniform diameter. The bushing balance controller allows a multiple segment glass fiber forming bushing to produce uniform diameter fibers by balancing the temperature between the various segments of the bushing and maintaining a constant average temperature.

We claim:

1. An apparatus for balancing the temperature in each segment of a multiple segment glass fiber forming bushing comprising:
    (a) a means to develop an error signal for each segment of the bushing, each said error signal being proportional to the difference in the temperature of that segment of the bushing and a set point temperature;
    (b) a means to sum all said error signals;
    (c) a means to develop an average of all said error signals;
    (d) a means to divert current from each segment of the bushing whose error signal is greater than said average error signal; and
    (e) a means to supply current to the bushing when said sum of the error signals is greater than a preset value.

2. An apparatus for balancing the temperature in each segment of a multiple segment glass fiber forming bushing comprising:
    (a) a means to determine a voltage drop across each segment of a glass fiber forming bushing;
    (b) a means to determine a current flow in the bushing;
    (c) a means for calculating an error signal for each segment of the glass fiber forming bushing based upon the voltage drop across the segment and the current flowing in the segment;
    (d) a means to sum the error signal from all segments of the glass fiber forming bushing;
    (e) a means to determine an average error signal;
    (f) a means to divert current flowing in each segment of the glass fiber forming bushing when the error signal for that segment exceeds the average error signal; and
    (g) a means to supply current to the glass fiber forming bushing when the sum of the error signals is below a preset value.

3. An apparatus for maintaining a constant temperature in each segment of a multiple segment glass fiber forming bushing comprising:
    (a) a glass fiber forming bushing compartmentalized into "n" individual segments and constructed of a material which has a linear relationship between resistance and temperature characterized by the relationship $$R_i = R_o[1 + \alpha(T_i - T_o)]$$

where
    i = 1 to n
    $R_i$ = instantaneous resistance of the i th segment of the bushing
    $R_o$ = resistance of the material at the set point temperature $T_o$
    $\alpha$ = resistivity change per degree Fahrenheit for the material used in the bushing
    $T_i$ = instantaneous temperature of the i th segment of the bushing
    $T_o$ = set point temperature of the segment of the bushing
    (b) a means to supply electrical current $I_B$ to the bushing;
    (c) a current transformer to produce a signal proportional to the current $I_B$ flowing in the bushing;
    (d) a means to determine a voltage drop $E_i$ across each segment of the bushing;
    (e) a means to determine an error signal $X_i$ for each segment of the bushing having the value:

$$X_i = CI_B - KE_i$$

where C and K are constants, such error signal also equal to $$X_i = KI_B R_o \alpha \Delta T_i$$

where
    $\Delta T_i$ = the difference between the instantaneous temperature $T_i$ of the i th segment of the bushing and the set point temperature $T_o$;
    (f) a means to determine the sum of all error signals $$\Sigma X = X_1 + X_2 + X_3 + \ldots + X_n;$$

(g) a means to determine an average error signal $$\overline{X} = \Sigma X / n$$

(h) a means to divert current from a section of the bushing when the error signal for that section is greater than the average error signal $$X_i > \overline{X};$$

(i) a control means to regulate the supply of electrical current $I_B$ to the bushing such that current is supplied only when the sum of all error signals ($\Sigma X$) is greater than a preset value; and
    (j) a means to disable measurement of the voltage drops and current when current is being diverted, and a means to disable current diversion when the voltage drops and current are being measured.

4. A method for balancing the temperature in each segment of a multiple segment glass fiber forming bushing comprising the steps of:
    (a) measuring a voltage drop across each segment of a multiple segment glass fiber forming bushing;
    (b) measuring the current flowing in the bushing;
    (c) calculating an error signal for each segment of the bushing based upon the measured voltage drop and current flow, said error signal being proportional to the difference between the temperature of the segment of the bushing and the set point temperature;

(d) calculating the sum of the error signals for all segments of the bushing;

(e) calculating the average error signal by deviating the sum of the error signals by the number of segments in the bushing;

(f) diverting current from each segment of the bushing whose error signal is greater than the average error signal; and (g) supplying current to the bushing when the sum of the error signals is below a preset value.

5. A method for maintaining a constant temperature in each segment of a multiple segment glass fiber forming bushing comprising the steps of:

(a) measuring a voltage drop across each segment of a multiple segment glass fiber forming bushing;

(b) measuring a current flow in the glass fiber forming bushing;

(c) calculating an error signal for each segment of the glass fiber forming bushing from the voltage drop across that segment of the bushing and the current flowing through the bushing;

(d) electronically modifying said error signal such that said error signal is proportional to the product of the difference between a present temperature and a set point temperature of that segment of the bushing and the current flowing through the bushing;

(e) summing all error signals;

(f) determining an average error signal from the average of the sum of all error signals;

(g) diverting current from each segment of the bushing when the error signal for that segment of the bushing is greater than the average error signal; and (h) applying power to the bushing when the sum of the error signals is below a preset value.

* * * * *